United States Patent Office 3,682,654
Patented Aug. 8, 1972

3,682,654
ARTIFICIAL FLAVORED BERRIES AND
PROCESS OF PREPARING SAME
Ernest W. Johnson, Minnetonka, Minn., assignor to
General Mills, Inc.
No Drawing. Filed Mar. 13, 1970, Ser. No. 19,490
Int. Cl. A23l 1/00
U.S. Cl. 99—103
10 Claims

ABSTRACT OF THE DISCLOSURE

Artificial flavored articles or berries having liquid centers are prepared by encompassing a first solution containing flavoring and a gel setting agent by a second solution containing a hydrophilic colloid.

The present invention relates to the preparation of artificial flavored articles having a liquid center (hereinafter termed berries). More particularly, it relates to such berries and the process of preparing same wherein portions of a solution containing flavoring and a gel setting agent are brought into contact with and encompassed by a solution of a hydrophilic colloid capable of being set-up or gelled by the gel setting agent.

British Pats. 556,718, 586,157 and 727,475 disclose that imitation soft fruit can be prepared by encompassing a solution of flavoring and sodium alginate (or similar material capable of being set-up) with a solution containing calcium ions or other agents capable of causing the alginate to gel or set-up. My experience has been that these processes eventually (in time) yield imitation fruits with a gum drop consistency throughout since the whole droplet contains the material capable of being set-up (alginate) and the metallic ion (calcium) continues to penetrate the interior.

I have now discovered that artificial flavored berries containing a liquid center can be simply prepared by merely encompassing an aqueous solution containing flavoring and a gel setting agent capable of causing an aqueous solution of hydrophilic colloid to set-up by such a hydrophilic colloid solution. Since the interior of the berry does not contain the material capable of being set-up, the surface film or skin is formed from the inside out and the center or interior remains liquid. My invention thus provides unique artificial flavored berries which find use as additives to various foods including ice cream, cakes, pastries, muffins, pies, sauces, jams, candies and the like.

In practicing my invention, two aqueous solutions are necessary. The first of these comprises water, flavoring and a gel setting agent capable of causing the hydrophilic colloid in the second solution to set-up and form a skin around portions or droplets of the first solution. Any of a wide variety of gel setting agents can be used depending somewhat on the particular hydrophilic colloid used in the second solution. Preferred such agents for use with low methoxyl pectin, sodium alginate and similar hydrophilic colloids are water soluble polyvalent metal salts such as the phosphates, sulfates, gluconates, chlorides and carbonates of calcium, aluminum and the like. Calcium is the preferred metallic ion and dicalcium phosphate is advantageously employed. Where the hydrophilic colloid is kappa type carrageenan and the like, the gel setting agent may preferably be a potassium salt such as potassium chloride. The gel setting agent will be present in the solution to be encased in an amount sufficient to provide enough gel setting capability to form an essentially continuous film or skin on the surface of portions or droplets of the solution when encompassed by the hydrophilic colloid solution. Preferably, the first solution will contain from about 0.25 to 5.0% by weight of the gel setting agent.

Any flavoring can be used in the solution to be encased. Thus the same may contain sugar, artificial sweeteners natural or artificial food flavors, fish flavor (such as when caviar is being simulated), mint chocolate, root beer, and the like.

The first solution may also contain coloring agents, mold inhibitors, thickeners, flavor intensifiers, plasticizers and the like. One preferred mold inhibitor is potassium sorbate. Preferred thickeners are pregelatinized starches and CMC (carboxymethyl cellulose). One often desirable flavor intensifier is citric acid, especially when the berries are to simulate natural fruits. Glycerine is the preferred plasticizer and also functions as a humectant.

The second solution comprises water and a hydrophilic colloid capable of being set-up by the gel setting agent. As indicated above, a variety of hydrophilic colloids are suitable including low methoxyl pectin, sodium alginate, iota carrageenan, kappa carrageenan and the like. The hydrophilic colloid is used in an amount sufficient to provide the desired encasement or skin for the berries of the invention. Preferably, the hydrophilic colloid will be present in the second solution in an amount of about 0.1 to 8.0% by weight.

The second solution may also contain coloring agents, mold inhibitors, flavorings, plasticizers, flavor intensifiers, and the like as above described. In such way, different colors and flavorings can be given to the encasement or skin in contrast to the liquid center portion.

Any procedure whereby portions of the first solution are brought into contact with and encompassed by the second solution may be used in this invention. Thus in a very simple aspect, drops of the first solution may be dropped from any common dropper into the second solution. Of course, more sophisticated pieces of apparatus may be employed such as that described in British Pat. 727,475. Depending on the skin thickness desired, the encased portions or droplets may be allowed to remain immersed in the second solution for varying periods of time. The only necessity is that the skin be essentially continuous and of sufficient strength to allow removal of the artificial flavored berries from the second solution. Preferred contact-encompassing times are from between about ¼ to five minutes. It is especially preferred that such time period be in the range of from about ½ to two minutes. The temperature of the solutions is also not critical. However, it is preferred that the same be in the neighborhood of 100 to 200° F. to speed the formation of skin on the berry.

Optionally, the berries may be further treated by bringing them into contact with a third aqueous solution comprising a gel setting agent. Such solution sets up any remaining free hydrophilic colloid in the skin of the berry. Again calcium is the preferred polyvalent ion for such third aqueous solution where the hydrophilic colloid is low methoxyl pectin, sodium alginate or the like. Such third solution may contain other ingredients including colorings and the like but the same generally will not contribute a great deal more to the products than additional setting-up of the hydrophilic colloid.

The following examples illustrate preferred embodiments of the invention without being limiting.

EXAMPLE I

A thoroughly mixed solution was prepared from the following ingredients:

| Ingredient: | Percent by weight |
| --- | --- |
| Water—distilled 125° F. | 73.40 |
| Dicalcium phosphate, dihydrate | 2.00 |
| Sugar (granulated sucrose) | 3.00 |
| Blueberry flavor | .20 |
| Artificial sweetener blend (93.75% calcium cyclamate, 6.25% saccharin) | .35 |
| Color mix (96% sucrose, 3% FD and C Red #2, 1% FD and C Blue #1) | 6.00 |
| Glycerine | 10.00 |
| Pregelatinized starch (tapioca) | 3.00 |
| CMC | .75 |
| Citric acid, anhydrous | 1.25 |
| Potassium sorbate | .05 |
| | 100.00 |

A second solution was prepared from the following ingredients:

| Ingredient: | Percent by weight |
| --- | --- |
| Water—distilled 200° F. | 85.75 |
| Low methoxy pectin (Exchange Brand #3466) | 3.00 |
| Glycerine | 10.00 |
| Citric acid, anhydrous | .40 |
| Color mix (as above) | .80 |
| Potassium sorbate | .05 |
| | 100.00 |

In making up the second solution, a blend of the citric acid and low methoxyl pectin was added to the water and thoroughly mixed to yield a clear, smooth, syrup-like mixture. The color mix and potassium sorbate were then added with continued mixing. Finally the glycerine was mixed in while maintaining the temperature of the solution at 180° F.

Individual droplets of the first solution were then dropped into the second solution. These drops were allowed to remain submerged in the second solution for ½ to 2 minutes. The resulting artificial blueberry flavored berries were then removed from the second solution. Such berries had a continuous skin or encasement and had a liquid center which remained as such for extended periods of storage. The berries were delicious and exhibited a highly interesting texture due to the liquid center.

EXAMPLE II

A first solution was prepared from the following ingredients:

| Ingredient: | Percent by weight |
| --- | --- |
| Water—distilled 25° F. | 88.55 |
| Pregelatinized starch (waxy maize) | 5.00 |
| NaCl | 2.00 |
| Cod liver oil | 2.00 |
| Dicalcium phosphate, dihydrate | 1.00 |
| Aluminum sulfate | .05 |
| CMC | 1.00 |
| Citric acid | .20 |
| Black paste color | .20 |
| | 100.00 |

Individual droplets of such first solution were dropped into a second solution consisting of 96.3% distilled water (25° F.), 3.0% low methoxy pectin, 0.2% black paste color and 0.5% fish flavor (pollack) (all percentages being by weight). The encased droplets were removed from the second solution after about two minutes submersion to yield berries resembling natural caviar in color, flavor and other properties. Such manufactured fish eggs can be stored in an emulsion of corn oil (81.08%), water (15.94%), NaCl (2.70%), black paste color (0.14%) and Tween 80 (0.05%) to further simulate commercial caviar products.

Berries (fruit, caviar or the like) prepared as above can be water washed if desired and/or treated with a third solution (i.e. 2% aqueous calcium gluconate) to further set the pectin encasement.

It is to be understood that the invention is not to be limited to the exact details of operation or the exact processes and compositions shown and described, as obvious modifications will be apparent to those skilled in the art and the invention is to be limited only by the scope of the appended claims.

The embodiments of the invention in which an exclusive property or privilege is claimed are defined as follows:

1. A process for preparing artificial flavored berries consisting of encompassing individual droplets of a first aqueous solution comprising flavoring and a gel setting agent capable of causing a hydrophilic colloid to set-up by a second aqueous solution comprising a hydrophilic colloid in an amount sufficient to form a set-up encasement around the individual droplets of said first solution and removing the resulting artificial flavored berries having a liquid center from such second solution.

2. The process of claim 1 wherein the first solution also contains at least one of the following: coloring agents, mold inhibitors, thickeners, flavor intensifiers and plasticizers.

3. The process of claim 2 wherein the gel setting agent is present in an amount of about 0.01 to 5.0% by weight in the first solution.

4. The process of claim 3 wherein the gel setting agent is a polyvalent metal salt.

5. The process of claim 4 wherein the salt is a calcium salt.

6. The process of claim 1 wherein the hydrophilic colloid is present in such second solution in an amount of about 0.1 to 8.0% by weight.

7. The process of claim 6 wherein the hydrophilic colloid is low methoxyl pectin.

8. The process of claim 5 wherein the hydrophilic colloid is low methoxyl pectin, said pectin is present in the second solution in an amount of about 0.1 to 8.0% by weight, the portions of this first solution are allowed to remain in the second solution for from about ¼ to 5.0 minutes, the flavoring is a combination of a fruit flavor and sugar, and the calcium salt is dicalcium phosphate.

9. The artificial flavored berries produced by the process of claim 1.

10. The artificial flavored berries produced by the process of claim 8.

References Cited

UNITED STATES PATENTS

| 2,703,286 | 3/1955 | Eppell | 99—168 X |
| 2,611,708 | 9/1952 | Owens et al. | 99—168 X |

FOREIGN PATENTS

| 883,976 | 11/1959 | Great Britain | 99—168 |

HOWARD R. CAINE, Primary Examiner

99—168

U.S. Cl. X.R.